April 22, 1941.    O. E. UECKER    2,239,509
VITREOUS ENAMEL TANK CONNECTION AND METHOD OF CONSTRUCTION
Filed June 24, 1938
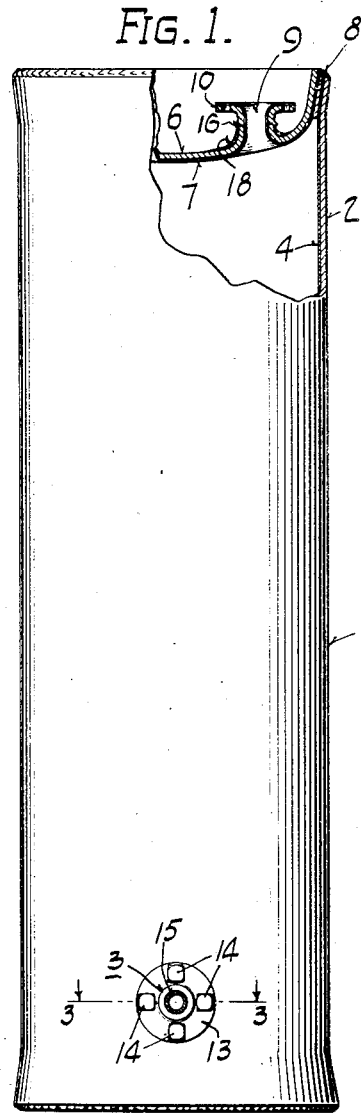
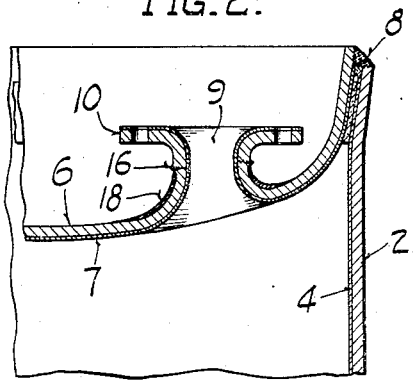
Fig. 2.
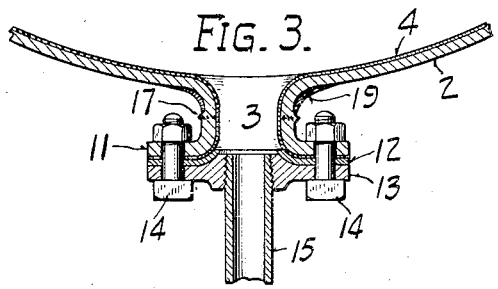
Fig. 3.
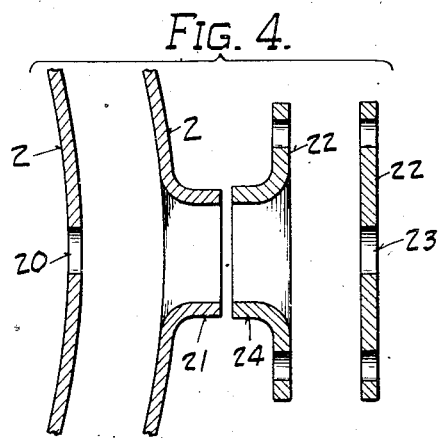
Fig. 4.
Otto E. Uecker
INVENTOR.
BY
ATTORNEY.

Patented Apr. 22, 1941

2,239,509

UNITED STATES PATENT OFFICE 2,239,509

VITREOUS ENAMEL TANK CONNECTION AND METHOD OF CONSTRUCTION

Otto E. Uecker, Milwaukee, Wis., assignor to A. O. Smith Corporation, Milwaukee, Wis., a corporation of New York Application June 24, 1938, Serial No. 215,650

4 Claims. (Cl. 29—157.4)

This invention relates to connections to vitreous enamel tanks and the method of their construction, and has particular relation to connections for such tanks which are pressure sustaining tanks employed in the heating or storage of hot water, although several features of the invention are applicable to other tanks and for other purposes.

Connections between hot water tanks and their associated piping have in the past been made in several ways. A common connection has been made by welding a threaded bushing onto the tank at the desired position and surrounding an opening in the tank and then screwing the pipe to be connected into this bushing. A construction of this kind is very unsatisfactory in tanks to be protected by vitreous enamel inner coatings. It is impossible to enamel into such an opening and protect all of the bushing without interfering with the threaded portion. The inner surface of the tank around such a bushed connection is not smooth or suitable for the application of a satisfactory enamel coating. When pressure is applied to a tank having a bushed opening of the type described the tank has excessive deflection adjacent the opening, it being a relatively weak construction. Injury to the enamel around the opening is liable to occur from the deflection.

Another common method of making an opening and connection to hot water tanks employed in domestic and similar services is to rivet or weld on a threaded neck by means of a saddle flange which is shaped to fit the immediate contour of the tank at the position of the opening and is integrally attached to the neck. Such a flanged connection, while frequently employed with galvanized tanks, presents the difficulties described above in relation to the welded bushing when applied to enamel protected tanks. While the deflection of the tank at the point of connection is lessened by employing the saddle flange, serious trouble is caused by the flange in the application of the enamel. The sudden change in the thickness of the tank caused by the addition of the flange causes unequal cooling of the tank after the firing of the enamel and during cooling. The tank has stresses set up in the vicinity of the opening by the unequal cooling, and these stresses deform the steel causing the enamel to chip off.

Other usual types of connections employed for the attachment of hot water tanks to their piping have resulted in similar difficulties and have been generally unsatisfactory for employment with vitreous enameled tanks.

The principal object of the present invention is to provide in a hot water tank a construction of a connection thereto that is highly satisfactory for use in tanks with protective coatings of vitreous enamel.

Another object is to provide a hot water tank connection which can be protected against corrosion.

Another object is to make a vitreous enameled hot water tank having openings no integral part of which is subject to corrosive attack.

Another object is to provide an economical and efficiently applied type of opening connection to a vitreous enameled hot water tank which can be readily enameled without injury occurring to the enamel in the vicinity of the opening.

Another object of the invention is to provide a method of constructing a connection opening to a vitreous enameled hot water tank that will make the enameling of the connection simple and efficient.

Other objects will appear hereinafter in connection with the description of the preferred embodiments and modifications thereof.

The invention is illustrated in the drawing in which:

Figure 1 is a side view of a hot water tank with a portion broken away at the end to disclose a partial longitudinal section;

Fig. 2 is an enlarged view of the sectioned portion shown in Fig. 1;

Fig. 3 is a sectional view taken at 3—3 of Fig. 1; and

Fig. 4 is a sectional view of certain parts shown in Fig. 3 at two stages of the manufacture.

Referring to the drawing, a tank 1 is illustrated which may be readily constructed with vitreous enameled interior surfaces. The shell 2 of the tank has an outlet connection 3. A vitreous enameled liner 4 has been applied to the inside of shell 2. An inset head 6 with enameled coating 7 is assembled in the shell and joined thereto by weld 8. An opening 9 in head 6 is provided for the attachment of piping to the tank.

Great difficulty has been experienced in providing a tank connection which will furnish the desired protection against corrosion of all points integral with the tank, permit the application of a protective enamel coating thereto simultaneously with the application of such a coating to the tank, not injure the enamel on cooling, resist the stresses to which the pressure in the tanks subjects it without injury to the coating, and be economically and readily constructed.

The connection arrangements shown at 9 and 3 are made in accordance with the present invention and are highly satisfactory.

The enameled coatings 7 and 4 extend out through the neck and over the outer faces of flanges 10 and 11. Gasket 12 rests over the enameled face of the flange 11 and is bolted between said flange and coupling flange 13 by bolts 14. The connecting pipe 15 is threaded into flange 13. The hot water of the tank is prevented from contacting any unenameled surface of the tank or opening integral therewith. The other parts such as flange 13 or pipe 15 can be of corrosion resistant material or can be replaced if necessary without injury to the tank.

The flanges 10 and 11 are joined to the head 6 and shell 4 respectively by welds 16 and 17 preferably produced by electric resistance or electric flash resistance welding; after which the inner surface of the welded area is reamed smooth in preparation for enameling. The joinder has been made by other methods of welding as for example electric arc welding but the presence of deposited weld metal on the inside of the joint has given trouble in enameling due to the enamel breaking away over such deposited metal. When the original metal of the parts has been retained at the weld by resistance or flash welding, the subsequently applied enamel is not subject to such injury at the weld.

Reenforcing metal has been applied to the head and shell around the openings at 18 and 19 respectively.

The tank and connnections are made in the following manner. A shell section is formed into the desired modified cylindrical shape by rolling or pressing a sheet into a cylinder, joining the longitudinal meeting edges by welding and then forming the ends of the shell to the desired shape for the assembly with the heads.

Referring to Fig. 4, a hole 20 is made in the shell 2 at the location of a desired pipe connection. The hole can be put in the sheet before rolling or after the cylinder is prepared. Next the sheet material around hole 20 is drawn by the use of suitable well known forming tools into a short tubular projection 21. A disc 22 having an opening 23 is then provided for an opening flange. The disc is then drawn out into tubular extension 24 corresponding in diameter to the projection 21.

Disc 22 is preferably of thicker gage than shell 2 to provide a flange of greater stiffness for bolting, but should not exceed approximately twice the thickness of the shell. The subsequent firing of the enamel extending over the shell and flange surfaces requires uniform simultaneous heating and cooling of the parts. The flange, due to its exposure, cools somewhat faster than the rest of the shell if of the same thickness as the shell but increasing its thickness too much will slow up the cooling of the flange and cause shrinkage stresses between the flange and shell which are sufficient to injure the enamel.

The flange and shell with their tubular projections are then placed in a welding machine in the relative positions indicated in Figure 4 and are welded together preferably by electric resistance welding. The tubular projection on shell 2 is kept as short as possible. The heat of the current employed in welding softens the metal in the projection adjacent the shell body, and the welding pressure applied in completing the weld thickens the metal around the opening and close to the shell. The thickening in this position obtained by the welding pressure assists in reenforcing the opening and preventing unequal deflection in service.

The completed assembly of the connection is shown in Fig. 3. In addition to the thickening of the outlet neck obtained adjacent the shell when welding, additional thickening by the deposit of metal at 19 by electric arc welding has been applied. Approximately 50% increase in the thickness of the shell has been found to be satisfactory. This amount of thickening does not produce serious distortion when cooling the assembly after the firing of the enamel.

The shell is next coated with an enamel frit throughout its inner surface and extending through the tubular opening and onto the outer surface of the flange 11. The shell assembly is then placed in a furnace and heated to the proper temperature to fuse the frit into vitreous enamel 4. With the construction described, cooling from the enamel fusing temperature does not injure the enamel, since no excessive stresses are set up around the opening by the cooling.

It will be noted also that smooth well rounded corners are readily obtained at the joinder of the flange and shell to the outlet neck during the process of making. Rounded corners are important in applying vitreous enamel coatings. The enamel pulls away from sharp corners during fusing, producing an imperfect coating at the sharp corners.

The head 6 is formed by pressing or any other suitable method. The outlet opening is then provided in a manner similar to the one described in connection with the shell.

The head assembly is then enameled, and a low cost, highly satisfactory head and outlet connection results.

The invention is claimed as follows:

1. A connection in a vitreous enamel protected hot water tank, comprising a tank section having an outwardly formed tubular extension thereto, a flange integrally attached to the tubular extension and providing a smooth interior surface for the connection with curved surfaces of substantial radii for receving the vitreous enamel coating, the wall of the extension having added thickness circumferentially thereof to provide a portion thicker than the tank section, the added thickness being gradual to provide uniform contour for preventing stress concentrations during fusing of the enamel and in service, and a protective vitreous enamel coating on the inside of said connection and extending through the opening.

2. A connection in a vitreous enamel protected hot water tank, comprising a tank section having an outwardly formed tubular extension thereto, a flange integrally attached to the tubular extension and providing a smooth interior surface for the connection with curved surfaces of substantial radii for receiving the vitreous enamel coating, the wall of the extension having weld metal deposited thereon to provide a portion thicker than the tank section circumferentially of the opening; the deposit being of gradually changing thickness from a minimum at the edge to a maximum in the center to provide uniform contour for preventing stress concentrations during fusing of the enamel and in service, and a protective vitreous enamel coating on the inside of said connection and extending through the opening.

3. The method of constructing a connecting opening in a vitreous enamel protected hot water tank, comprising the steps of making a hole in the tank section at the location for the opening, forming outwardly a portion of the tank wall surrounding the hole to provide a short tubular extension on the outside and having a curvature of substantial radii merging the same with the tank wall, adding thickness to the wall of the extension circumferentially thereof to provide a portion thicker than the tank section and of gradual contour to prevent stress concentrations during fusing of the enamel and in service, welding a flange on the outer end of the tubular extension, and applying a vitreous enamel protective coating simultaneously to the interior of said tank section, the tubular extension and over at least a portion of the outer surface of said flange.

4. The method of constructing a connecting opening in a vitreous enamel protected hot water tank, comprising the steps of making a hole in the tank section at the location for the opening, forming outwardly a portion of the tank wall surrounding the hole to provide a short tubular extension on the outside and having a curvature of substantial radii merging the same with the tank wall, depositing weld metal on the outside of the tubular extension circumferentially thereof to provide a portion thicker than the tank section and of gradual contour to prevent stress concentrations during fusing of the enamel and in service, welding a flange on the outer end of the tubular extension, and applying a vitreous enamel protective coating to the interior of said tank section, the tubular extension and over at least a portion of the outer surface of said flange.

OTTO E. UECKER.